D. D. LEWIS.
RAILROAD FROG.
No. 1,602. Reissued Jan. 5, 1864
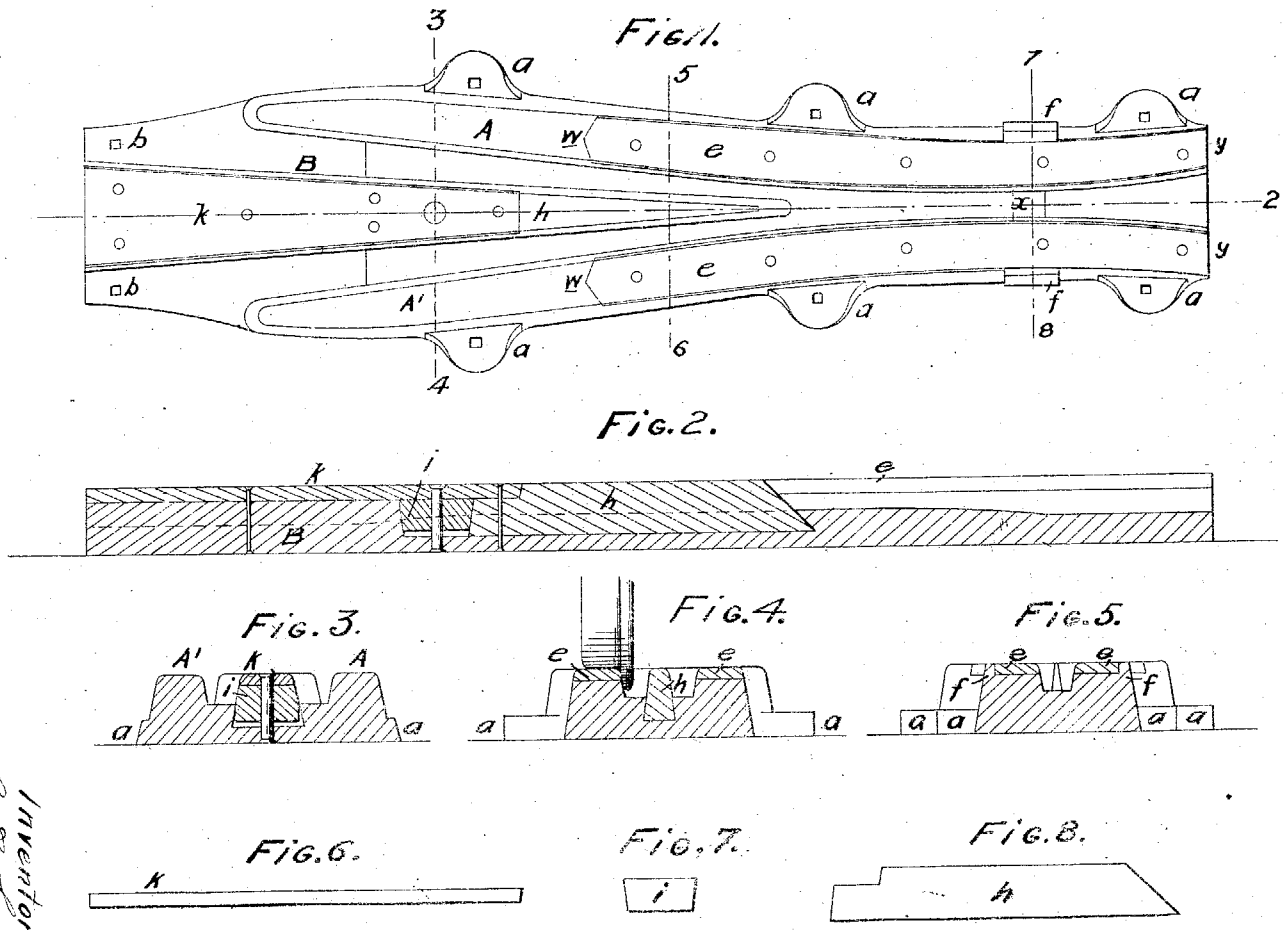
Witnesses:
W. Albert Stace
Charles Howson.
Inventor:
D. D. Lewis
Henry Howson

UNITED STATES PATENT OFFICE.

D. D. LEWIS, OF PHILADELPHIA, PENNSYLVANIA.

IMPROVEMENT IN RAILROAD-FROGS.

Specification forming part of Letters Patent No. 24,034, dated May 17, 1859; Reissue No. 1,602, dated January 5, 1864.

*To all whom it may concern:*

Be it known that I, DAVID D. LEWIS, formerly of Tamaqua, Pennsylvania, but now of Philadelphia, Pennsylvania, did obtain Letters Patent of the United States for an Improvement in Railroad-Frogs, which Letters Patent I now deem inoperative and invalid by reason of a defective specification; and I do hereby declare the following to be a full, clear, and exact description of the said invention, reference being had to the accompanying drawings, and to the letters of reference marked thereon.

My invention consists in the peculiar formation of the ribs of railroad-frogs, fully described hereinafter, whereby the sudden lateral strains to which both cars and frogs are subjected when the former pass over the latter are in a great measure obviated, and whereby the wear and tear of the frogs and the loosening of the same from their foundation are to a great extent prevented.

My invention further consists in a mode, described hereinafter, of securely fastening the steel point to the frog.

In order to enable others skilled in this class of railway work to make and apply my invention, I will now proceed to describe the manner of constructing the same.

On reference to the accompanying drawings which form a part of this specification, Figure 1 is a plan view of my improved railroad-frog; Fig. 2, a longitudinal sectional elevation on the line 1 2, Fig. 1; Fig. 3, a transverse section on the line 3 4, Fig. 1; Fig. 4, the same on the line 5 6, Fig. 1; Fig. 5, the same on the line 7 8, Fig. 1; and Figs. 6, 7, and 8, views of detachable portions of the frog.

Similar letters refer to similar parts throughout the several views.

My improved frog consists of a cast-iron plate having the two exterior ribs A and A′ and the intermediate angular rib, B.

Although of a form somewhat similar to that of the frogs in common use, my improved frog differs from those heretofore made in several important particulars.

On reference to Fig. 1 it will be seen that the inner edge of each of the ribs A and A′ is curved throughout its entire length, that each rib, from what may be termed the "throat" *x* of the frog is curved gently outward in both directions.

It will also be seen on reference to Figs. 3, 4, and 5 that the inner edge of each of the ribs A and A′ is inclined and rounded at the upper corner, so as to be adapted to the flanges and treads of the car-wheels.

The objects and advantages of these features will be explained hereinafter.

The frog is secured to a suitable foundation by bolts passing through holes in lugs *a a*, and others passing through holes *b b* at one end of the frog. A steel plate, *e*, is secured by means of suitable rivets to each of the opposite side ribs, A and A′, the plate extending from the end *y* of the frog to the point *w*, so that a hard steel surface is presented throughout the greater portion of the ribs for the car-wheels to bear on. The flanges of the car-wheels have a tendency to move these steel plates outward, especially at the throat *x*, and, as ordinary rivets do not suffice to prevent the plates from being torn from their bearings, a strip, *f*, is cast to and forms a part of each of the ribs A and A′ of the frog near the throat *x* and serves to resist the outward pressure imparted to the plates *e* by the car-wheels. As an additional security for the plates they are made of a V form at the points *w*, the ends of the plates fitting against a shoulder of a similar form on the ribs. No lateral strain can therefore disturb the position of the plates at this point.

The intermediate pointed rib, B, is constructed as follows: The extreme point *h* consists of steel let into a recess in the body of the frog, both the point and recess being of the dovetailed form represented in Fig. 4. Between the rear of the steel point *h* and the rear end of the recess in which it fits there is a space just large enough to receive the block *i*, the presence of which within the said space prevents the sliding back of the point from its dovetailed socket. On the removal of the block *i*, however, which may be done by simply raising it upward out of its recesses, the steel point *h* may be moved back from its socket and raised out of the recess free from the frog.

The rear end of the point *h* is cut away or recessed on the top so as to receive the end of the steel tread-plate *k*, which is secured by rivets to the intermediate rib of the frog by a rivet passing through the block *i* and by another rivet passing through that end of the tread-plate which overlaps the rear end of the point *h* through the latter and through the body of the frog.

When it becomes necessary to replace the steel point *h* with a new one, the burred heads of the rivets may be readily cut away, the tread-plate *k* removed, the block *i* raised from its recess, the worn point *h* moved back from its socket, and a new point fitted to its place.

It will be observed that the block *i* is slightly larger at its upper than on its lower end, so that on securing the rivet the block must act as a wedge and force the point *h* so tight up into its socket that no action of the car-wheels can loosen it.

It is well known that railroad-frogs are subjected to the most severe lateral strains and jars, and that they last but a comparatively short time, the strains being so severe that the frogs either become loosened from their foundations or the ribs become so worn by the action of the wheels that the frogs must of necessity be removed and replaced with new ones.

The severe strains to which frogs are subjected are communicated with more or less force to the cars, engines, &c., which pass over them. The rapid wear and tear of the cars may, in fact, be attributed in a great measure to the strain to which they are subjected in passing over frogs.

My improved frog has been designed with the view of preventing, or, at least, diminishing, the above evils.

In all railroad-frogs the narrow throat *x* is necessary, and it is at this point where the greatest strain is exerted, hence the importance of curving the ribs A and A′ gradually outward from this point in both directions, so that the car-wheels may be directed gradually and gently toward the throat and from the same, instead of being directed in a straight line abruptly toward the throat and in a like straight line equally as abruptly from the throat, which is the case when wheels pass over the frogs as constructed prior to my invention. Thus by using the curved ribs both the frogs and the cars are to an important extent relieved from the injurious lateral strains and shocks previously alluded to.

In ordinary frogs the edges of the ribs A and A′ are abrupt, no provision being made for so constructing the ribs that they will conform to the car-wheels, as is the case with my improved frog.

By beveling the edges of the ribs and rounding the corners so that the ribs may conform to or nearly conform to the shape of the wheels two advantages are obtained, first, the climbing of the wheels onto the ribs as they approach and leave the throat of the frog is prevented and the inordinate wear and tear of the ribs thereby prevented; secondly, this adaptation of the ribs to the wheels adds to the easy and gentle approach of the wheels to and departure from the throat of the frog.

I am aware that detachable steel points have heretofore been dovetailed to railroad-frogs. I therefore lay no claim to such a device; but

I claim as my invention—

1. The ribs A and A′, curved from the throat *x* outward in both directions, as set forth, for the purpose specified.

2. The ribs A and A′, so beveled and rounded on the edge that they will conform to or nearly conform to the treads and flanges of the car-wheels, for the purpose described.

3. The steel point *h*, dovetailed to the body of the frog, in combination with the tread-plate *k* and the block *i*, when the said tread-plate overlaps and is secured to the said point, and when the block *i* is of such a tapering or wedge-shaped form that during the process of riveting it and the tread-plate to the body of the frog the said block may serve the purpose of driving the point tight into its socket.

In testimony whereof I have signed my name to this specification before two subscribing witnesses.

DAVID D. LEWIS.

Witnesses:
C. E. FOSTER,
C. BRAZER.